United States Patent
Andrews et al.

(10) Patent No.: US 8,756,119 B1
(45) Date of Patent: Jun. 17, 2014

(54) SHIPMENT AGGREGATION IN MOBILE PHONE ORDER FULFILLMENT

(75) Inventors: John P. Andrews, Overland Park, KS (US); Abhik Barua, Overland Park, KS (US); Deandra T. Cassone, Overland Park, KS (US); Mark William Reiff, LaGrande, KY (US)

(73) Assignee: Sprint Communications Company L.P., Overland Park, KS (US)

( * ) Notice: Subject to any disclaimer, the term of this patent is extended or adjusted under 35 U.S.C. 154(b) by 217 days.

(21) Appl. No.: 13/293,107

(22) Filed: Nov. 9, 2011

(51) Int. Cl.
*G06Q 30/00* (2012.01)

(52) U.S. Cl.
USPC ......... 705/26.81; 705/1.1; 705/330; 705/338; 705/334

(58) Field of Classification Search
USPC ................. 705/26.81, 338, 330, 334, 1.1
See application file for complete search history.

(56) References Cited

U.S. PATENT DOCUMENTS

| | | | |
|---|---|---|---|
| 2008/0306795 A1* | 12/2008 | Ho | 705/8 |
| 2009/0182613 A1* | 7/2009 | Bhogal et al. | 705/10 |
| 2011/0029446 A1* | 2/2011 | Benda et al. | 705/330 |

\* cited by examiner

*Primary Examiner* — Yogesh C Garg

(57) ABSTRACT

A method for aggregating mobile phone orders for shipping to a recipient comprising analyzing, by a server computer, orders placed via a plurality of ordering systems, wherein the orders may comprises a plurality of ordered items; identifying, by the server computer, recipient addresses with common destinations; unifying, by the server computer, the identified recipient addresses with common destinations; determining, by the server computer, criteria for when to release an order for shipment to a recipient; accumulating, by the server computer, ordered items for the recipient; combining, by the server computer, the accumulated ordered items into a shipment, wherein a shipment comprises at least one container; and releasing, by the server computer, the container for shipment when at least one of the criteria is met.

19 Claims, 3 Drawing Sheets

US 8,756,119 B1

SHIPMENT AGGREGATION IN MOBILE PHONE ORDER FULFILLMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the course or processing multiple orders, some companies may send multiple packages to the same address, spaced relatively closely together in time. For example, a clothing wholesaler may ship a box of men's slacks to a retailer one day, and then ship a box of women's blouses to the same retailer the following day. Given some latitude in when the retailer may need to receive the orders, it may be advantageous for the wholesaler to postpone the shipment of the order of men's slacks and combine it with the order of women's blouses and place it into one box, in an attempt to save shipping costs by minimizing the number of containers (e.g. boxes) shipped separately.

SUMMARY

In an embodiment, a method for aggregating mobile phone orders for shipping to a recipient is disclosed. The method for aggregating mobile phone orders for shipping to a recipient comprises analyzing, by a server computer, orders placed via a plurality of ordering systems, wherein the orders may comprise a plurality of ordered items; identifying, by the server computer, orders that have common destinations; unifying, by the server computer, addresses of identified orders with common destinations; determining, by the server computer, criteria for when to release an order for shipment to a recipient; accumulating, by the server computer, ordered items for the recipient; combining, by the server computer, the accumulated ordered items into a shipment, wherein a shipment comprises at least one container; and releasing, by the server computer, the container for shipment when at least one criterion is met.

In an embodiment, a system for aggregating items for shipping to a recipient is disclosed. The method comprises an order analysis routine operable to analyze orders to a vendor that are placed via a plurality of ordering systems and to recognize orders that have common destinations; an address unification routine operable to identify recipient addresses that have common destinations and unify the identified recipient addresses that have common destinations; a criteria management routine operable to determine criteria for when to release an order for shipment to a recipient; an order accumulation routine operable to accumulate ordered items for a recipient into a shipment, wherein a shipment comprises at least one container; and an order shipping routine to release the order for shipment when at least one criterion is met.

In an embodiment, a method for aggregating items for shipping is disclosed. The method comprises gathering, by a server computer, orders to a vendor that are placed via one or more ordering systems; identifying, by a server computer, which of a plurality of addresses for the recipient represent common destinations; unifying, by the server computer, the identified recipient addresses with common destinations; determining, by the server computer, aggregation rules for the recipient; determining, by the server computer, order priority criteria for an order from the recipient; analyzing, by the server computer, the aggregation rules for the recipient and the order priority criteria for the order from the recipient; accumulating, by the server computer, ordered items for a recipient, based on the analysis of the aggregation rules for the recipient and the order priority criteria for the order from the recipient; assembling the accumulated ordered items into a shipment; and releasing, by the server computer, the shipment for shipping when one of an aggregation rule and an order priority criterion is met.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
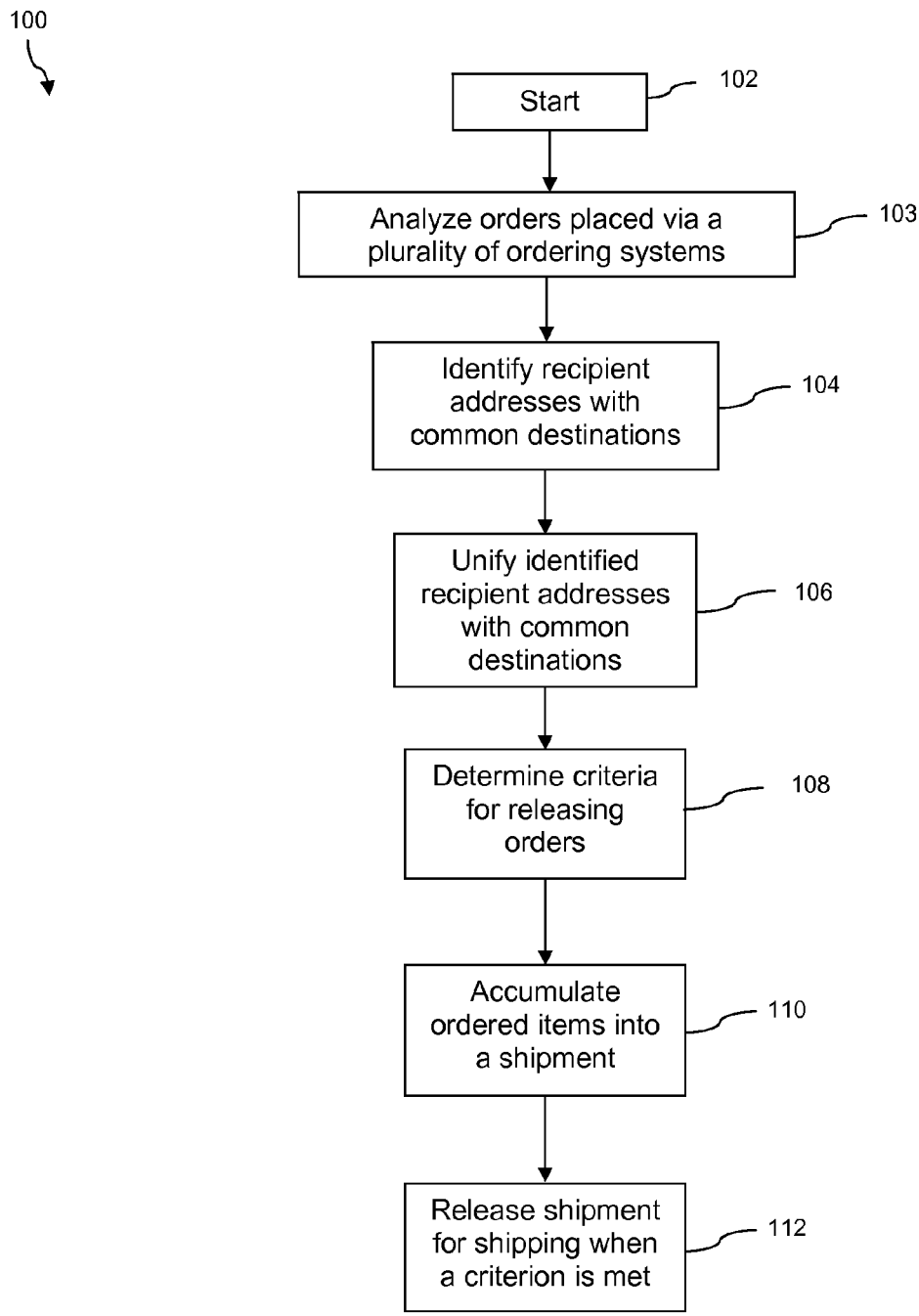
FIG. 1 illustrates a flowchart of a method, according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Herein, the following terms should be considered as similar, for the sake of explanation and/or discussion of the disclosure: shipment, box, container, parcel, package, pallet, and/or other terms used to describe an item or items that may be shipped, via any means, from one location to another (e.g. from a vendor to a customer).

In an embodiment, a system and methods are disclosed. The system and methods provide the ability to aggregate orders into shipments such that the number of packages (e.g. shipments, containers, boxes, etc.) shipped may be reduced, in order to reduce shipping expenses. For example, a Company A may ship multiple orders to the same destination over a period of time. Given a variety of parameters associated with the order such as when the customer wants and/or needs to receive the order, when a carrier may pickup the order, how long it takes the carrier to deliver the order, and any number of other parameters associated with the shipment of the order, it may be advantageous for Company A to hold and/or delay release of an order or a portion of an order so that they may combine orders into a smaller number of shipments in order to reduce the associated shipping costs. By holding and/or delaying orders (or portions of orders) until, for example, a shipping container is full, or at least as full as possible, given the sometimes-competing constraints involved in delivery of ordered goods, the number of containers shipped may be reduced. In addition, improving the space-filling of a shipping container may also help improve shipping efficiency.

In another embodiment, a vendor may receive orders via more than one ordering system. These ordering systems may operate independently from each other, yet may process orders that may be destined for the same address (e.g. the same recipient). For example, a vendor retail site may have the ability to place an order for products from the vendor via computer, phone, fax, and/or other methods of placing an order. In addition or alternatively, there may be multiple computer systems and/or different software packages on one or more computers at a single vendor retail site that may be used for ordering products. If several employees place orders for products to be shipped to the same location (e.g. the retail outlet) independently, and each employee uses a different system or different software for placing the orders, each of the orders may result in separate shipments, all of which are destined for the same location. Since each of the ordering systems/methods may not communicate with one another, they may therefore not be aware that they are generating orders and/or shipments that could be aggregated into fewer orders. By analyzing and/or comparing orders across all ordering system, orders that are to be shipped to common destinations may be aggregated into fewer shipments. In addition or alternatively, comparing orders across all ordering systems may provide additional opportunities for order aggregation and/or other forms of system efficiency increases, whether or not there are opportunities for order aggregation.

In yet another embodiment, if for example a vendor (e.g. a merchant) has a contract rate with a shipper to ship a given container at a flat rate, it may be less cost-effective to ship a container that is not completely full than it would be to completely fill the container to its capacity, as the cost will be the same, whether the container is full or empty. Shipping less-than-full containers may result in sending more than one shipment to the same destination, each of which has space for additional items. This wasted space may lead to increased costs for shipping, which may in turn lead to a decrease in profits for the vendor. Combining items that are being shipped to the same destination may increase efficiency and hence profits for the vendor.

In a current real-world example, the Unites States Postal Service offers Priority Mail Service that includes "flat rate" boxes of various sizes such as a small, medium, and large flat-rate boxes. The large flat-rate box may currently be shipped anywhere within the continental United States for $14.20, and is limited to 20 pounds in shipping weight—there is no limit to the number of items that may be shipped in the large flat-rate box, as long as it will fit within the confines of the box and does not exceed the 20-pound weight limit. So, it would be cost-inefficient to place two items that occupy ¼ of the box and weigh a total of 5 pounds into a large flat-rate box and ship it to a customer. In this example, you would be wasting approximately 75% of the shipping capacity of the container, yet you would pay full price (e.g. the flat rate) for shipping the container. It may be more cost-efficient to wait until 6 more of these items (assuming essentially uniform weight and volume of the items) were ready to be shipped to the same customer and then put all eight items into the box and utilize all of the available space and the weight limit of the flat-rate box. If the customer (e.g. the receiver of the package) is not in a particular hurry to receive the items, it may be possible to delay shipment until the flat-rate box may be more fully utilized. If, on the other hand, the customer does desire to have the items shipped in a more timely manner, it still may be acceptable to delay the shipment awhile, in order to add more items to the container in an attempt to increase the efficiency, even if not to the full extent of the capacity of the flat-rate box.

Given the above, however, there are additional considerations to keep in mind when trying to maximize shipping efficiency. For example, some large customers may have multiple receiving addresses for a given site. This may be complicated by the fact that different entities (e.g. cost centers) of a large company may give a supplier different shipping address to which the vendor is to ship items. While the differences in the addresses may be subtle (e.g. the difference between "West Main Street" and "W. Main St."), it may be difficult to sort through the addresses and discern that some addresses are, in fact, the same. This may lead to confusion and decreased efficiency for the vendor, as the vendor may ship multiple items to multiple address of the same customer, only to have the items end up at the same destination of the customer. The large company may, for example, have a single shipping/receiving department that accepts shipments for a plurality of cost centers within the company. The shipping department may operate multiple receiving docks for shipping and/or receiving within the company, all of which may be at the same site, but at different locations within the site. By way of example, Company B may have a large site that has four receiving docks at the site. One of the receiving docks may serve 20 cost centers. Each of the cost centers may have a plurality of departments, divisions, groups, teams, or other such organizational entities, each of which may place orders from a Vendor A.

When placing orders, each organizational entity within Company B may list their shipping address differently. For example, a first entity may list their shipping address as,
[Address 1]:
Company B, Inc.
R&D Group
1234 First Street
Mail Stop 567
Anytown, Anystate 98765
A second organizational entity, which may be collocated at the same site with the first organizational entity, and which may be served by the same receiving dock (and which may actually be a part of the same higher-level organization), may give Vendor A a shipping address of,
[Address 2]:
Research Group, Company B
1234 1$^{st}$ St.
Anytown, Anystate 98765

While one of ordinary skill in the art may be able to look at these two addresses and determine that they are actually the same location, when taken literally they are different. For example, it may be apparent to an observer of the addresses that "First Street" is the same as "1$^{st}$ St." However, given that computers and/or software may be involved in the processing of these orders, and also given that computers may have difficulty discerning intent (e.g. determining that similar addresses actually represent the same destination), it may lead to an undesirable shipping scenario. For example, a computer-based shipping system may consider Address 1 and Address 2 as being different. The issue described in the example above, wherein the terms "First" and "1$^{st}$" are literally different, but practically the same, may arise from voice communications or other communications means that may produce ambiguous results. For example, when a person such as a customer contacts a vendor and places an order, the person placing the order may verbally communicate the term "First", but the person receiving the order may write down "$1^{st}$". While neither of these terms is wrong, nor is one more correct than the other, this type of terminology difference may lead to challenges in homogenizing addresses that may be intended to be the same, literally and/or figuratively.

A computer-based shipping system may therefore ship one container to Address 1, and a second container to Address 2, when putting the contents of both containers into a single container and shipping the single container to an address (e.g. a unified address) that will suitably deliver the single container to the correct destination would be less costly and more efficient, in terms of shipping resources and expenses. This scenario may lead to additional shipping complications and/or challenges, in terms of creating multiple orders to a vendor with different (e.g. disparate) addresses. It may result in a vendor creating multiple incomplete shipments (e.g. less-than-full containers) to multiple addresses for a customer, only to have the multiple incomplete shipments arrive at the same location of Company B.

In an embodiment, the computer-based shipping system may comprise one or more applications residing on a computer such as a server computer, or may be distributed across any number of computers or servers, each of which may perform one or more of the functions described in the present disclosure. In addition, the application or applications may comprise routines or subroutines that provide one or more of the functions described in the disclosure, as may be suitable for a given system or method. For example, an application suitable for implementing the methods of the present disclosure may comprise an address identification routine, a criteria management routine, an order accumulation routine, and an order shipping routine. In an embodiment, any number or manner of routines or subroutines may be employed to implement the methods of the present disclosure.

In addition or alternatively, some non-computer based shipping systems (e.g. human-based shipping systems) may likewise not be able to make this determination, or may have difficulty doing so. While a person of ordinary skill in the art may be able to determine that Address 1 and Address 2 are the same, it is not the case that any/all people may be able to make a similar determination, or at least may not be able to do so without additional information. For example, a shipping agent may see Address 1 and Address 2 and may not realize that they are the same, but may question whether or not they are the same. The shipping agent may have to contact the customer related to the two addresses and may inquire as to whether or not Address 1 and Address 2 are actually intended to arrive at the same destination, and may then proceed with aggregating orders for these two addresses. This may also be inefficient and time-consuming for a vendor.

Given the large number of organizational entities that may be part of a company such as Company B, and given that each person within each organizational entity may, on any given order, list their shipping address differently, Vendor A may end up with a large number of addresses for Company B, and may have trouble determining whether some of them are actually going to end up at the same destination or not. The ability to sift through multiple addresses for Company B and determine which are actually going to end up at the same final destination of Company B may offer Vendor A the ability to combine orders and/or portions of orders in a way that improves Vendor A's shipping efficiency and hence reduces Vendor A's shipping costs, and may thereby increase Vendor A's profits. Therefore, a system and/or methods of unifying addresses may prevent or resolve issues relating to multiple customer addresses that are intended to go to common destinations. If, for example, Vendor A determines which shipping addresses for a given company are destined for the same final location, they may be able to unify the disparate addresses such that they reduce redundant small shipments to the same destination.

Using the example from above, if Vendor A determines that the addresses,
[Address 1]:
Company B, Inc.
R&D Group
1234 First Street
Mail Stop 567
Anytown, Anystate 98765
[Address 2]:
Research Group, Company B
1234 $1^{st}$ St.
Anytown, Anystate 98765
are actually to be shipped to the same company, same group, and same receiving dock, Vendor A may be able modify (e.g. unify) the shipping addresses and change both to, for example,
R&D Group/Research Group
Company B, Inc.
1234 First Street
Anywhere, USA 98765
or such. Vendor A may then be able to place multiple ordered items for both entities into a single shipment or fewer shipments and ship them in fewer containers, which may thereby reduce the number of packages they ship to the same address. Vendor A may actually be able to coordinate a database that, when analyzed appropriately, searches all addresses for Company B and unifies any/all combinable addresses such that they may reduce the number of disparate addresses into a smaller number of unified addresses, and may thereby optimize shipping efficiency to Company B on a large scale.

There may also be competing interests involved in shipping. For example, there may be overall business objectives such as cost, customer expectations, carrier contract rates, service-level agreements, and such. These interests may influence shipping aggregation decisions in a given direction—a direction that may or may not be aligned with other considerations. For example, system capabilities may dictate capacity and/or capabilities, in terms of what front-end systems, order management systems, warehousing systems, and other systems may be capable of handling. Also, operational constraints such as workforce capabilities, shipper capabilities (e.g. time of day, order volume, route considerations, etc.), and shipping container constraints. Any/all of these parameters may need to be taken into consideration, when assessing the viability of order aggregation. In an embodiment, a model for optimizing all interests described herein, or subsequently identified may provide a suitable operational model for order aggregation.

Turning now to FIG. 1, a method 100 is disclosed. At step 102, method 100 begins. Note that, in the methods described in FIG. 1 and FIG. 2 (the latter to be discussed in further detail, herein below), it should be assumed that all ordered items discussed and/or described in the methods that are to be put into a single shipping container are taken to be ordered by the same customer. In other words, when a shipping container is being filled with ordered items, it should be understood that all of the ordered items in that shipping container were ordered by the same customer (e.g. company)—orders from different customers are not mixed within a shipping container.

At step 103, orders that have been placed via a plurality of ordering systems are analyzed. In some embodiments, orders may be placed by a variety of means, with a variety of systems. These orders may be scrutinized (e.g. analyzed) across any/all appropriate ordering (or other) systems in order to determine if there are orders contained within the various systems that are destined for the same location. Making this determination may help identify orders that may be suitably combined for order aggregation, as discussed herein. In addition or alternatively, cross-system comparisons may provide additional opportunities for system optimization/harmonization that may or may not directly involve order aggregation. For example, comparing orders across systems may highlight duplicate and/or redundant orders.

At step 104, recipient addresses with common destinations are identified. As described above, a company or business may have a plurality of addresses associated therewith, wherein each address may not be exactly the same as the others. Though some of the addresses may actually be intended to be identical, typographical errors, different abbreviations for portions of the addresses, and/or other differences may arise when addresses are created or communicated to others. As in the example given above, addresses intended to be identical may sometimes contain differences in layout and/or format, such that when analyzed by a computer, the addresses may be interpreted as distinct (e.g. different from one another). This may cause a vendor or a shipper to prepare a shipment for a first address and another shipment for a second address, when in fact the first address and the second address refer to the same physical location. By failing to recognize that the first and second addresses reference the same location, the shipping effort may be unnecessarily duplicated. The duplication of effort may lead to excess shipping expenditures and may reduce shipping efficiency. In an embodiment, unifying duplicate (even if not exact duplicates) addresses may increase shipping efficiency by avoiding duplication of effort resulting from sending multiple shipments to a destination when shipments could have been combined to reduce the number of containers shipped.

In an embodiment, a vendor may receive orders from multiple systems. For example, a vendor may have a system or systems in place at a retail outlet associated with the vendor. The vendor may also accept orders directly from customers (e.g. end-users of the vendor's products) via a variety of means such as telephone orders, internet orders, mail orders, and so on. Similarly, a vendor may accept orders from systems dedicated to entities such as a large business customer, a government agency, a foreign affiliate, and/or other entities. Each of these entities may have separate and/or different ordering systems, software, ordering protocols, ordering procedures, and such. It may therefore be advantageous for the vendor to analyze all orders placed via more than one ordering system, to check for those orders that may be shipping to common destinations. Doing so may present additional opportunities for order aggregations and the cost savings related thereto.

In an embodiment, a computer program may be configured to scrutinize a collection of addresses, such as a list of addresses for a particular company, and identify addresses that have common destinations. At step 106, the computer program may unify the addresses that it identifies as having common destinations, such that addresses with common destinations are converted to a unified address that helps ensure that any items ordered for shipping to the original address are shipped to the unified address. This may facilitate order aggregation by assigning the unified address to the orders and permitting other ordered items with the same unified address to be added to the same shipments, and may thereby increase efficiency by maximizing the number of ordered items combined into a smaller number of shipments (e.g. containers).

In an alternative embodiment, at steps 104 and 106, the address screening and unifying steps may be conducted manually. For example, an agent or agents of the vendor and/or shipping entity may contact the entities placing orders from a customer site and may inquire about the collocation of a group of addresses. The agent/agents may further assign a unified address to those addresses identified as destined for the same location. This information may then be fed into a database so that future orders may be compared (either manually or via a computer program) and then used to redirect subsequent orders to the unified addresses when so indicated, in an attempt to aggregate ordered items into a reduced number of shipping containers possible.

At step 108, criteria for releasing orders are determined. In an embodiment, a number of criteria for releasing orders (e.g. shipments) may be determined. For example, a customer may stipulate when they want an order to arrive. Given the constraints of when a carrier (e.g. FedEx or UPS) may be able to pickup the package and what the transit time may be, there may be a "ship-by time" derived therefrom. For example, assume a customer places an order for an item on a Monday afternoon at 4:30 pm and stipulates that they want it to arrive by end-of-business on the following Friday. If, for example, the vendor knows that the carrier they are planning to use only picks up packages from the vendor's warehouse at 5:00 pm on weekdays, and further knows that it takes three days in transit for a package to arrive at the customer's location, the vendor may assign the order a ship-by time of 4:00 pm on the following Tuesday. This may be sufficient time to allow the carrier to pick the shipment up on Tuesday at 5:00 pm and get it to the customer no later than end of business on the following Friday. Therefore, one of the criteria that a vendor may set for an order may be a ship-by time of 4:00 pm on Tuesday.

In addition or alternatively, a vendor may designate a "priority" for an order such that, for example, a priority order may supercede any other orders the customer may have made. In this way, a customer may be able to have a vendor "leap frog" the customer's priority orders over existing orders to meet critical needs, for example. Therefore, a shipping container of ordered items may be held on, for example, a shipping dock, awaiting additional ordered items to fill the shipping container. If a priority item comes in that specifies "ship immediately", the priority item may be added to the shipping container and the shipping container may be released for shipment, immediately. This may also be considered a form of criteria, as described herein above.

In addition or alternatively, a vendor may also set their own criteria for when to release an item or order for shipment. For example, a vendor may have standard shipping containers that are capable of holding a given number and/or a given weight of items. The vendor may, therefore, set quantity and/or weight criteria for when to seal up a shipping container and ship it out. This may have the added advantage of assuring that each shipped container is as full as possible, which may lead to greater shipping efficiency by avoiding shipping empty space, as may result from shipping scenarios in which order aggregation is not practiced.

In an embodiment, any number of criteria may be stipulated by a vendor, a shipping agent, and/or a customer, in order to ensure that delivery schedules are as efficient as possible, while concurrently attempting to maximize shipping efficiency by ensuring that as many items as possible are aggregated into each shipment.

At step 110, ordered items are accumulated (e.g. aggregated) into a shipment. As previously described, a shipment may comprise any type of container, an ordered item, any number of ordered items, or such, as may be appropriate for a given situation, need, or desire. In an embodiment, ordered items may be placed into a first shipping container. The container may remain open, and may be staged (e.g. set aside) in anticipation of additional ordered items. As additional items are ordered, if they are destined for the same location (based on techniques described herein), they may be added to the first shipping container. Then, when a criterion is met, as will be described in greater detail below, the first shipping container may be sealed with whatever ordered items are contained therein, and released for shipment (e.g. pickup by a carrier). As additional items are ordered by a customer, a second shipping container may be staged for accepting the additional ordered items. This process may be repeated as needed, as additional items are ordered. Each shipping container may be designated for a single location (e.g. destination), and may be based on a unified address, as one of ordinary skill in the art would realize.

In step 112, a shipment is released for shipping when a criterion is met. In an embodiment, when any single criterion is met, the shipment may be released for shipping. For example, if a shipping container is configured to hold 24 units (e.g. ordered items); a criterion may be set to indicate that the container is full when it has 24 units in it. When the $24^{th}$ unit is placed into the container, the container may be considered full and the criterion is met, therefore the container is ready for shipment. This may be accomplished by issuing a shipping ticket, or any such method as may be suitable to release the shipment for shipping.

In an embodiment, a customer may have a "standing order" (e.g. an order for 100 units to be shipped every Saturday, to provide inventory for Monday morning). This standing order may also be taken into consideration, when aggregating other orders. Situations may arise wherein piecemeal orders may be aggregated with a standing order, to increase shipping efficiency. In addition or alternatively, the schedule of the standing order may be adjusted to some extent, so as to provide the opportunity for combining shipments, taking into consideration whether or not the adjustment negatively impacts other orders or competing considerations. For example, if an order that would constitute a partially filled shipping container must be shipped on Thursday to meet a delivery constraint to a specific retail store, the periodic standing order that would otherwise ship on Saturday may instead be incorporated into the Thursday shipment—jumping ahead of the normal periodic schedule—to reduce what otherwise would be two shipments to one shipment, thereby saving shipment costs.

In an embodiment, there may be a time-based criterion that indicates that one of the ordered items must be shipped no later than 4:00 pm on Tuesday, in order to arrive at a destination by Friday afternoon of the same week. This ordered item may be placed into a shipping container, along with any other ordered items contained therein. The shipping container may be staged, and additional ordered items may be added to the shipping container as they are ordered. Other ordered items within the container may have other criteria that may not have yet been met, and so have not triggered the release of the shipment. However, when the time-based criterion of 4:00 pm on Tuesday is met, assuming no other criteria for other ordered items in the shipping container have yet been met, the shipping container, whether completely filled or not, may be sealed and released for shipment. In this manner, the ordered item associated with the time-based criterion will actually be the determining factor in when the entire shipment is sent. As such, any/all shipping containers may be held until such time as a determining criterion is met. This way, a vendor may be able to ensure that each shipping container is as full as possible, prior to releasing the shipment. This may provide increased shipping efficiency and hence decreased shipping costs.

The present system and methods may provide additional benefits to organizations that handle large numbers of shipments and/or ordered items. Imagine, for example, a company such as a mobile phone service provider that ships thousands or even tens of thousands of mobile phones per day. Further, imagine that on a given day, the mobile phone service provider ships 40,000 mobile phones, and of those 40,000 mobile phones, 15,000 are shipped to a same address on the same day, and that these 15,000 shipments to a same address on the same day were all shipped for next day delivery. Therefore, of these 15,000 phones, at least 7,500 of them were phones that could have been combined with at least one other phone of the remaining 7,500 phones that were shipped on the same day, to arrive the following day at the same address. These "co-destined partner phones" could have been combined into a shipment with their corresponding partner, thereby yielding the same result (e.g. 15,000 phones arriving at their proper destination, the next day), but which could have been shipped in no more than 7,500 shipments instead of 15,000 shipments, had order aggregation been employed. It is also possible, given the above example, that there may be occasions wherein three or more mobile phones were shipped in one day to the same location, so fewer than 7,500 shipments may have resulted. That is to say that the maximum number of shipments that could have resulted in the above example using efficient order aggregation, per the system and methods of the present disclosure, would be 7,500 shipments. This may lead to an improvement in shipping efficiency and cost savings on a large scale for a company that makes numerous shipments, especially if the company makes many shipments to multiple common destinations, and even more so if the company makes many shipments to multiple common destinations on the same day.

In addition, using the above example, there may also be instances within the 40,000 shipments where multiple shipments are sent to the same location, but are not aggregated because the addresses do not appear to be the same, as noted above in the address unification description above. Therefore, an even greater number of opportunities for order aggregation may exist if addresses are efficiently unified, as described.

Figure 2:
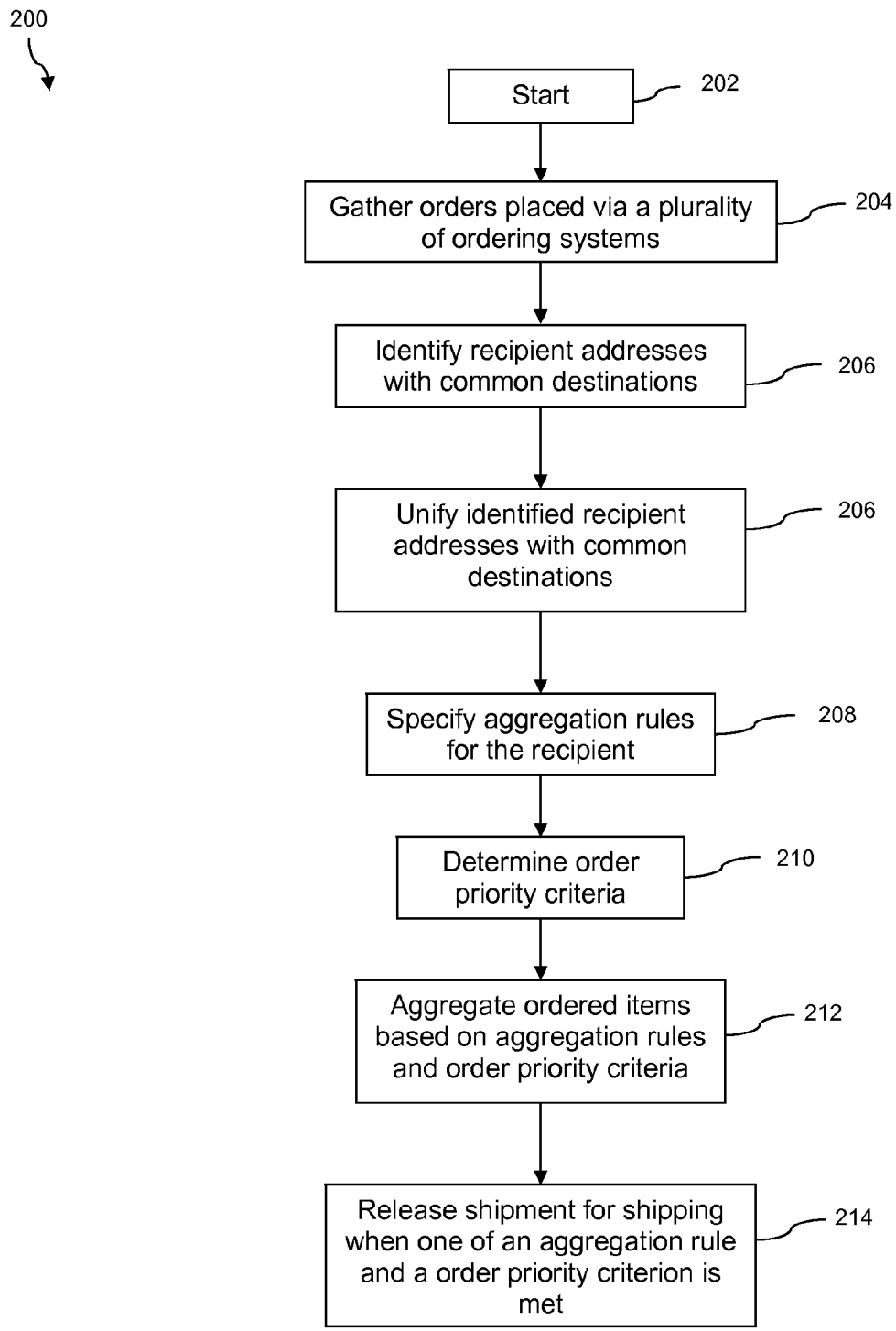
FIG. 2 illustrates a flowchart of a method, according to an embodiment of the disclosure.

Turning now to FIG. 2, a method 200 is described. In step 202, the method 200 begins. In step 204, a plurality of orders placed via a plurality of ordering systems may be gathered. As discussed herein above, more than one ordering system may be utilized by multiple people or locations. By gathering orders across all of these systems for comparison, orders destined for common locations may be identified, as will be discussed in greater detail, herein. For example, a database of shipments to a Customer X may be analyzed, and all addresses to Customer X may be gathered. At step 204, the gathered addresses of Customer X may be analyzed and disparate addresses (e.g. addresses that appear to be different) that are actually addresses for common destinations may be identified. This may facilitate order aggregation, in that it may prevent sending more than one shipping container to the same address. As discussed above, if addresses are not exactly the same, it may lead to unintentional duplication of shipments by having orders with addresses that appear to be different shipped separately, but which will actually be sent to the same location (e.g. destination).

In step 206 addresses with common destinations that have been identified are given unified addresses. As described in examples above, identified addresses with common destinations may be assigned unified addresses that either combine portions of the disparate addresses into a unified address, or which remove portions of the non-unified addresses which do not add useable information to the address. If a first address contains superfluous information that does not actually add anything, in terms of destination information, it may be removed without negatively impacting the shipment of an item to the correct destination. For example, if the first address is:
Company Y, Inc.
Mail Station 1234
P.O. Box 4321
1113 Lucky Avenue
Anyville, Kans. 67890
Information such as the P.O. Box may be irrelevant, as packages may be shipped directly to the customer at their street address. In this example, "P.O. Box 4321" may be removed, in order to prevent this address from appearing different from an address such as:
Company Y, Inc.
Mail Station 1234
1113 Lucky Avenue
Anyville, Kans. 67890
which, as one of ordinary skill in the art would recognize as the same as the prior address, but which would appear to be different if compared strictly, as might be done for example by a computer-based comparison algorithm. In addition, "Mail Station 1234" may not be information that is used to get a shipment to the receiving dock of Company Y. This information may, for example, be relegated to a packing list or such, so that when the shipment is received by the receiving dock and processed through Company Y's receiving system, the individual ordered items that are destined for Mail Station 1234 may be properly distributed within Company Y without the confusion of having that information on the shipping label of the shipping container. Any information which does not provide actual value, with respect to getting a shipment to the proper destination, may be removed and/or modified as appropriate in order to produce a simplified, unified address. Thereafter, as determined in step 206, addresses that actually represent a common destination may be replaced with a unified address to simplify shipping, and to facilitate order aggregation. This process may serve as a form of disambiguation that may help identify addresses that are the same, in practice, which may then help to produce unified addresses in order to facilitate the order aggregation process.

At step 208, aggregation rules are specified. If, for example, there are specific needs/desires/requirements that stipulate certain ordered items should be associated within a given shipment, they may be specified and associated with the ordered item or items. A customer may stipulate any number or variety of aggregation rules such as that only a certain type of product may be placed in shipping containers together, that only a certain number of products may be placed in shipping containers together, that shipments may only be held for a limited time before being released, or any other such order aggregation rules as they may see fit. In addition and/or alternatively, a vendor may specify aggregation rules for shipments, as well. As with customer-specified aggregation rules, a vendor may specify any type or number of aggregation rules, as may be suitable for a given situation.

At step 210; ordered items are accumulated (e.g. aggregated) based on aggregation rules and order priority criteria. As previously described, orders may be aggregated to any extent, and may be held and/or released based on any of aggregation rules and/or order priority criteria. At step 212 ordered items are aggregated, based on the aggregation rules and order priority criteria. Ordered items may be aggregated into shipping containers based on common destinations as may be determined by unified addresses, as previously described. Shipping containers may be held in place for order aggregation until such time as one of the determining factors (e.g. aggregation rules or priority criteria) is met. At step 214, when one of the order aggregation rules or a priority criterion is met, the shipment is released for shipping. For example, if one of the aggregation rules specifies that an ordered item in a shipping container must be shipped by a specific time/date, when the specified time/date is reached (whether or not the shipping container is completely full); the order may be released for shipping. In this way, it may be assured that the specific ordered item in the shipment that must be shipped by the specified time/date is shipped according to the aggregation rule. This takes into consideration the fact that no other ordered item in the shipment has met either their aggregation rules or a priority criterion. As stated previously, when any single ordered item in the shipment reaches a triggering event (e.g. meets an aggregation rule or a priority criterion), the shipment is released. In this way, it may be determined that all items in a shipment will meet-or-exceed their shipping requirements as specified by either a customer or a vendor, while still facilitating improved shipping efficiency by aggregating shipments and then shipping orders to unified addresses.

Figure 3:
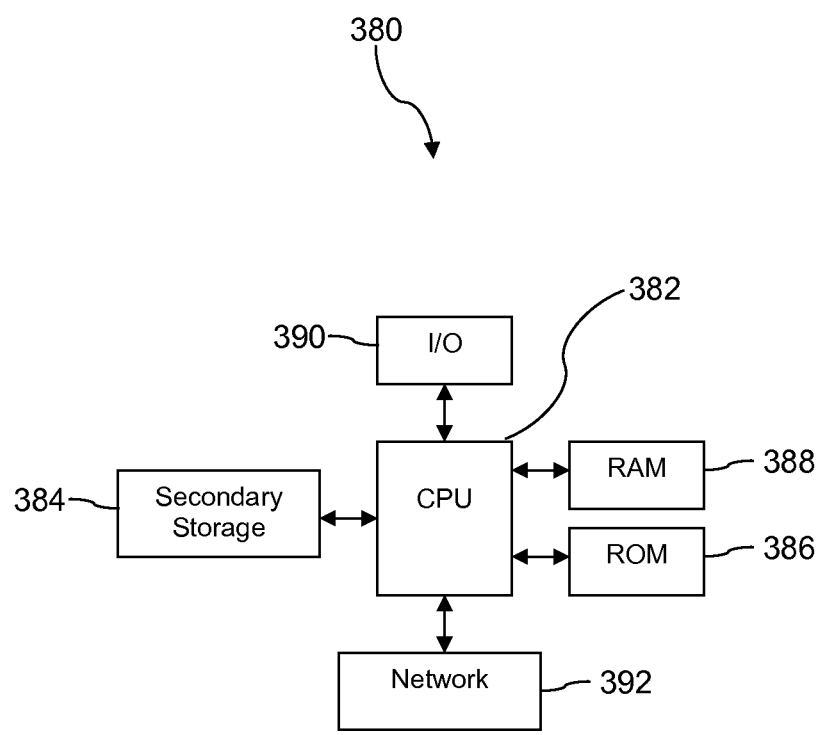
FIG. 3 illustrates a computer system suitable for implementing several embodiments of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that may be implemented by loading executable software into a computer may be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for aggregating mobile phone orders for shipping to a recipient comprising:
   receiving a plurality of mobile phone orders including a first mobile phone order associated with a first address and a second mobile phone order associated with a second address from a plurality of ordering systems;
   analyzing, by a server computer, the received plurality of mobile phone orders placed via the plurality of ordering systems;
   determining, by the server computer, that the first address and the second address represent a common destination, wherein the first address and the second address are different;
   unifying, by the server computer, the first and the second addresses with the common destination, wherein the unifying comprises modifying, by the server computer, at least one of the first address or the second address so that the first mobile phone order and the second mobile phone order are sent to the common destination;
   determining, by the server computer, criteria for when to release at least one of the plurality of mobile phone orders for shipment to a recipient;
   accumulating, by the server computer, ordered items for the recipient;
   combining, by the server computer, the accumulated ordered items into a shipment, wherein the shipment comprises at least one container; and
   releasing, by the server computer, for delivery to the common destination, the at least one container for shipment when at least one criterion is met.

2. The method of claim 1, wherein the plurality of ordering systems comprises a web-based ordering system, a retail ordering system, a non-retail ordering system, a telephone-based ordering system, a customer-specific ordering system, a software-based ordering system, a manual ordering system, and an automatic ordering system.

3. The method of claim 1, wherein the criteria comprises at least one of a container full condition, a shipper cutoff time, an optimal shipment size, an optimal shipment contract rate, a need-by time, an order priority criterion, and a must-ship time.

4. The method of claim 3, wherein the order priority criterion is specified by the recipient.

5. The method of claim 3, wherein products within the at least one container are all the same.

6. The method of claim 1, wherein the order priority criterion supersedes all other criteria.

7. The method of claim 1, wherein products within the at least one container are not all the same.

8. The method of claim 1, wherein products are reshuffled between two or more containers in order to improve shipping efficiency.

9. The method of claim 8, wherein the reshuffling comprises redistributing ordered items into containers with other ordered items with at least one of similar criteria or common destinations.

10. The method of claim 1, wherein the common destination comprises locations that the recipient considers to be the same for purposes of receipt of delivery of ordered items.

11. The method of claim 1, wherein the recipient comprises one or more of a customer, a receiving agent, a retail outlet, a third-party, and a distribution center.

12. A system for aggregating items for shipping comprising:
   an order aggregation application residing on at least one server computer that is operable to manage mobile phone order shipping comprising:
      an order analysis routine operable to analyze a plurality of mobile phone orders to a vendor that are placed via a plurality of ordering systems and to recognize orders that have common destinations, wherein the plurality of mobile phone orders comprise a first mobile phone order associated with a first address and a second mobile phone order associated with a second address;
      an address unification routine operable to:
         determine that the first address and the second address represent a common destination, wherein the first address and the second address are different; and
         modify at least one of the first address or the second address so that the first mobile phone order and the second mobile phone order are sent to the common destination,
      a criteria management routine operable to determine criteria for when to release at least one of the plurality of mobile phone orders for shipment to a recipient,
      an order accumulation routine operable to accumulate ordered items for the recipient into a shipment, wherein the shipment comprises at least one container, and
      an order shipping routine to release the at least one of the plurality of mobile phone orders for shipment to the common destination when at least one criterion is met.

13. The system of claim 12, wherein the criteria comprises one or more of a container full condition, a shipper cutoff time, an optimal shipment size, an optimal shipment contract rate, a need-by time, and a must-ship time.

14. The system of claim 12, further comprising a routine for determining an order priority criterion.

15. The system of claim 14, wherein the order priority criterion is assigned by the recipient and supersedes all other criteria.

16. A method for aggregating items for shipping comprising:
- receiving, by a server computer, a plurality of mobile phone orders including a first mobile phone order associated with a first address and a second mobile phone order associated with a second address from a vendor that are placed via a plurality of ordering systems;
- determining, by a server computer, that the first address and the second address represent a common destination, wherein the first address and the second address are different;
- unifying, by the server computer, the first and the second addresses with the common destination, wherein the unifying comprises modifying, by the server computer, at least one of the first address or the second address so that the first mobile phone order and the second mobile phone order are sent to the common destination;
- determining, by the server computer, aggregation rules for a recipient of at least one of the plurality of mobile phone orders;
- determining, by the server computer, order priority criteria for the at least one of the plurality of mobile phone orders from the recipient;
- analyzing, by the server computer, the aggregation rules for the recipient and the order priority criteria for the at least one of the plurality of mobile phone orders from the recipient;
- accumulating, by the server computer, ordered items for the recipient, based on the analysis of the aggregation rules for the recipient and the order priority criteria for the at least one of the plurality of mobile phone orders from the recipient;
- assembling the accumulated ordered items into a shipment; and
- releasing, by the server computer, the shipment for shipping to the common destination when one of an aggregation rule and an order priority criterion is met.

17. The method of claim 16, wherein the criteria comprises one or more of a container full condition, a shipper cutoff time, an optimal shipment size, an optimal shipment contract rate, a need-by time, and a must-ship time.

18. The method of claim 16, wherein products are reshuffled between two or more containers and redistributed into containers with other ordered items with one or more of similar criteria and common destinations.

19. The method of claim 16, wherein the common destination comprises locations that the recipient considers to be the same for purposes of receipt of delivery of ordered items.

* * * * *